US010592176B2

(12) United States Patent
Zhu et al.

(10) Patent No.: US 10,592,176 B2
(45) Date of Patent: Mar. 17, 2020

(54) PRINTER AND MEDIUM

(71) Applicant: Brother Kogyo Kabushiki Kaisha, Nagoya-shi, Aichi-ken (JP)

(72) Inventors: Feng Zhu, Nagoya (JP); Hidekazu Ishii, Inazzawa (JP); Koichi Kondo, Inuyama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/143,882

(22) Filed: Sep. 27, 2018

(65) Prior Publication Data

US 2019/0146730 A1 May 16, 2019

(30) Foreign Application Priority Data

Nov. 10, 2017 (JP) ................................ 2017-217301

(51) Int. Cl.

| | |
|---|---|
| ***G06F 3/12*** | (2006.01) |
| ***B41J 29/38*** | (2006.01) |
| ***B41J 13/00*** | (2006.01) |
| ***B41J 15/04*** | (2006.01) |
| ***B41J 29/48*** | (2006.01) |
| ***B41J 11/00*** | (2006.01) |
| ***B41J 3/407*** | (2006.01) |

(52) U.S. Cl.

CPC .......... *G06F 3/1219* (2013.01); *B41J 3/4075* (2013.01); *B41J 11/009* (2013.01); *B41J 11/0075* (2013.01); *B41J 11/0095* (2013.01); *B41J 13/0027* (2013.01); *B41J 15/044* (2013.01); *B41J 29/38* (2013.01); *B41J 29/48* (2013.01); *G06F 2206/1506* (2013.01)

(58) Field of Classification Search

CPC ........... G06F 3/1219; G06F 2206/1506; B41J 11/009; B41J 11/0075; B41J 3/4075; B41J 15/044; B41J 11/0095; B41J 13/0027; B41J 29/38; B41J 29/48

See application file for complete search history.

(56) References Cited

FOREIGN PATENT DOCUMENTS

JP 2016-192102 A 11/2016

*Primary Examiner* — Christopher Wait

(74) *Attorney, Agent, or Firm* — Banner & Witcoff, Ltd.

(57) ABSTRACT

The disclosure discloses a printer including a CPU that executes a detection process, a first determination process, and a first mode switching process. In the detection process, a type of a storage body is detected. In the first determination process, it is determined on the basis of a detection result whether the type of the storage body attached to the attaching part is a first type in an ordering state associated with insufficiency in quantity or a second type other than the first type. In the first mode switching process a control mode is switched from a normal mode prepared in advance correspondingly to the second type to a medium-saving mode prepared in advance correspondingly to the first type for reducing a consumption amount of the print-receiving medium than the normal mode, in the case that the type is determined as the first type.

14 Claims, 14 Drawing Sheets

[FIG. 1]
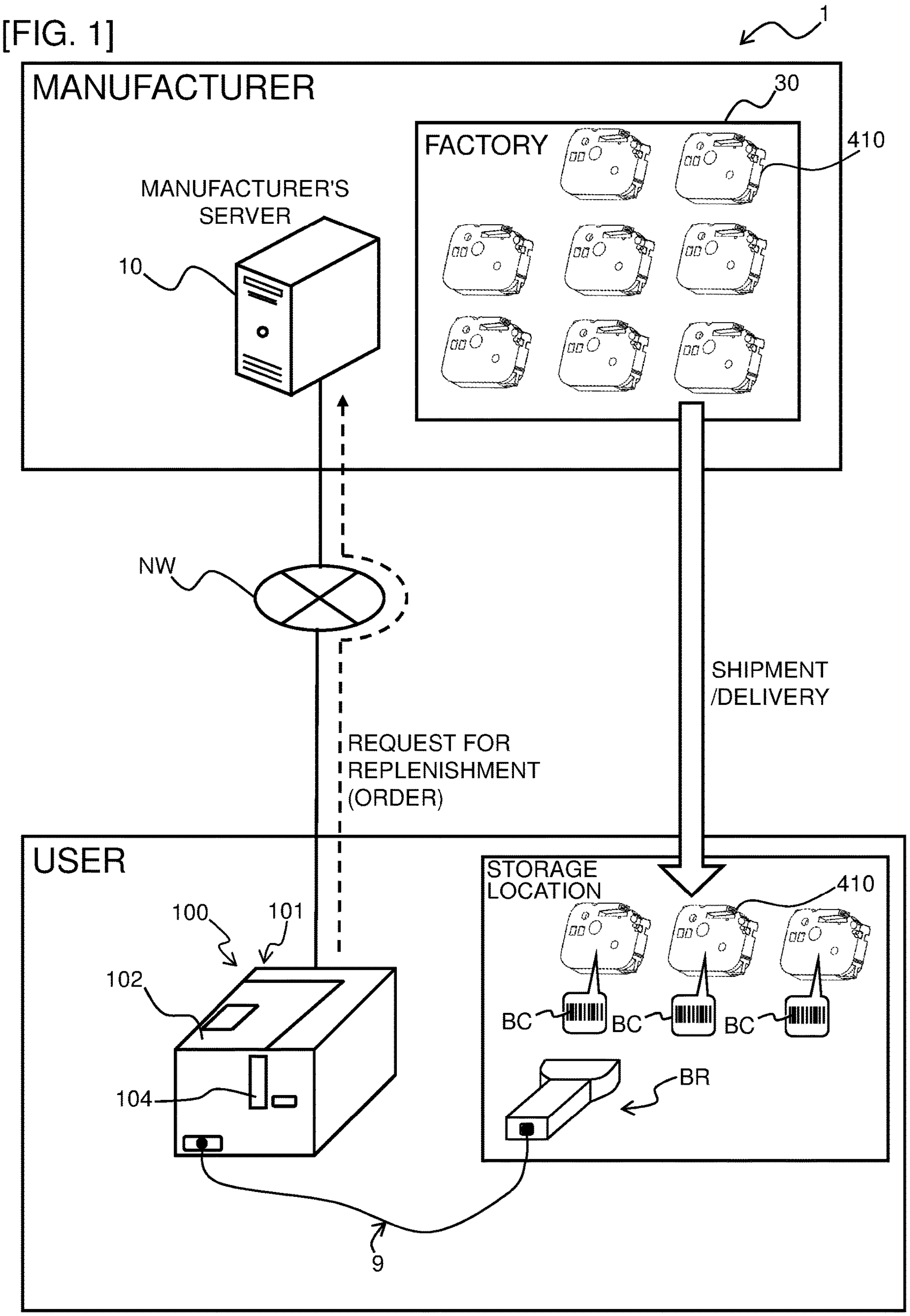

[FIG. 2]
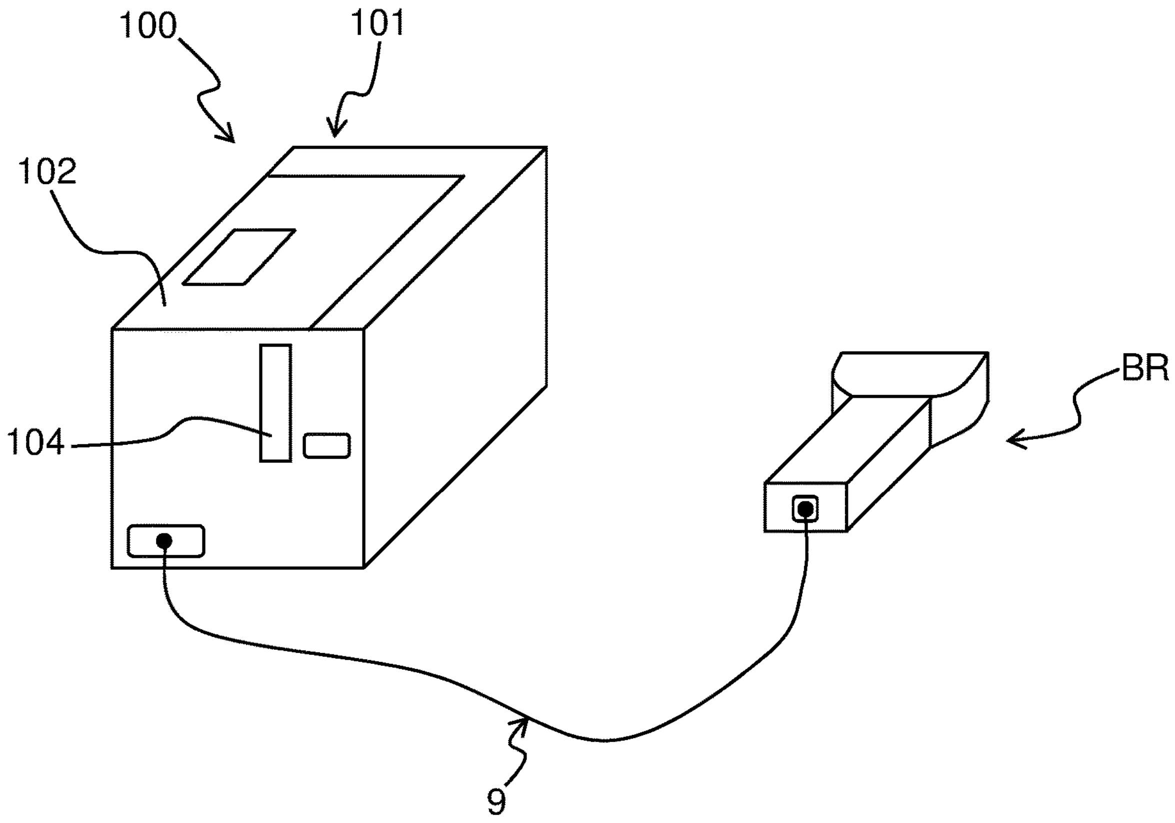

[FIG. 3]
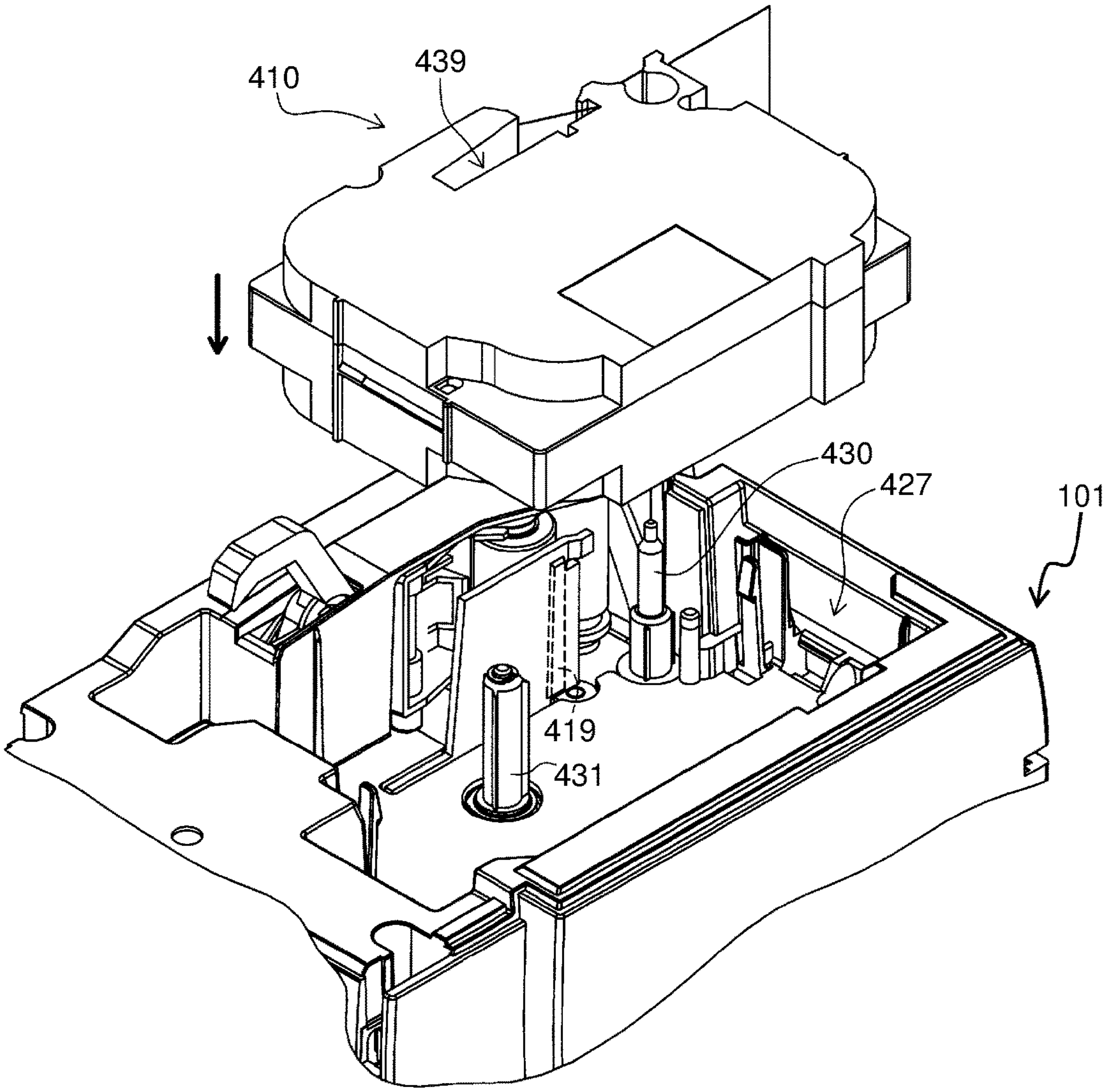

[FIG. 4]
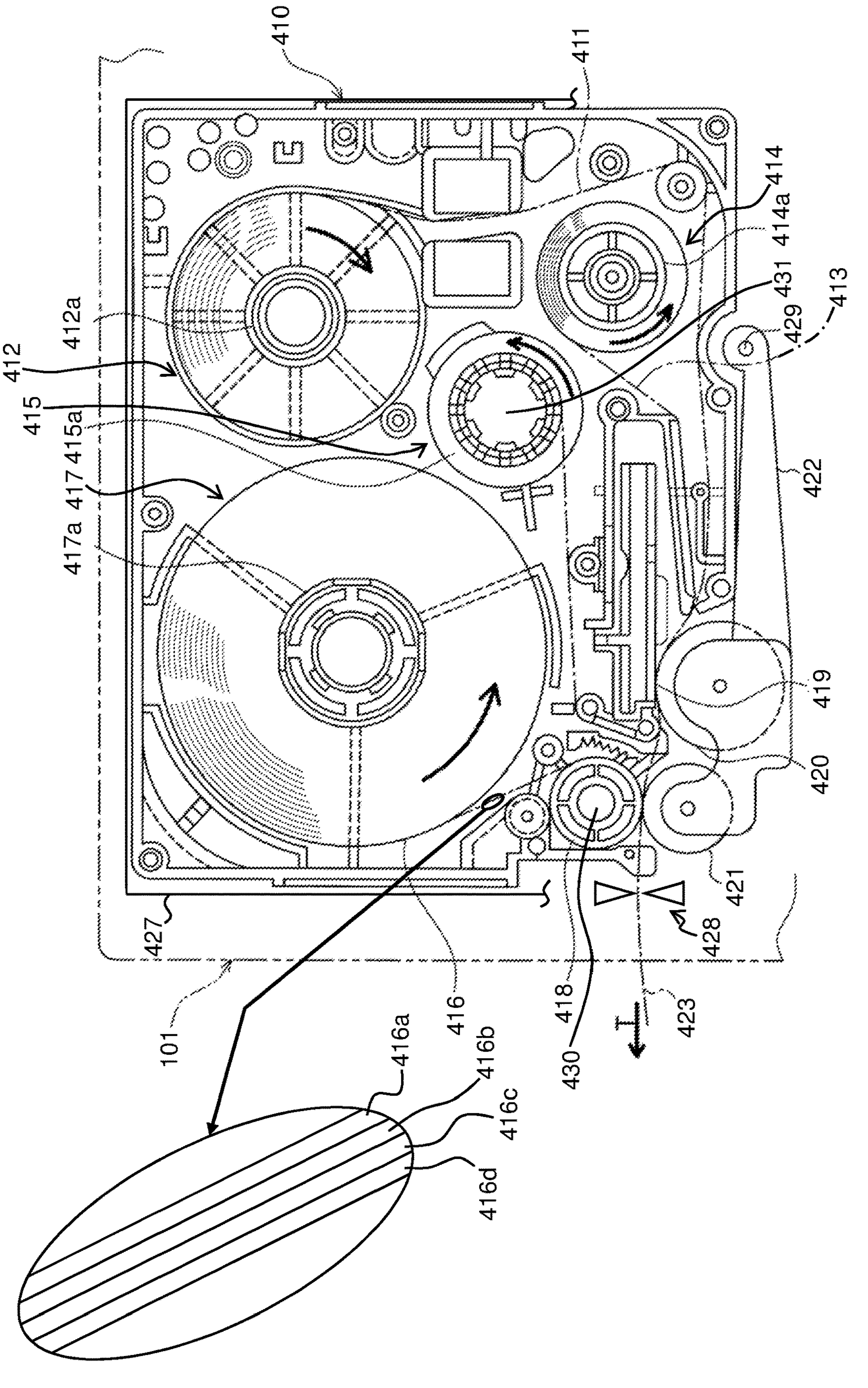

[FIG. 5]
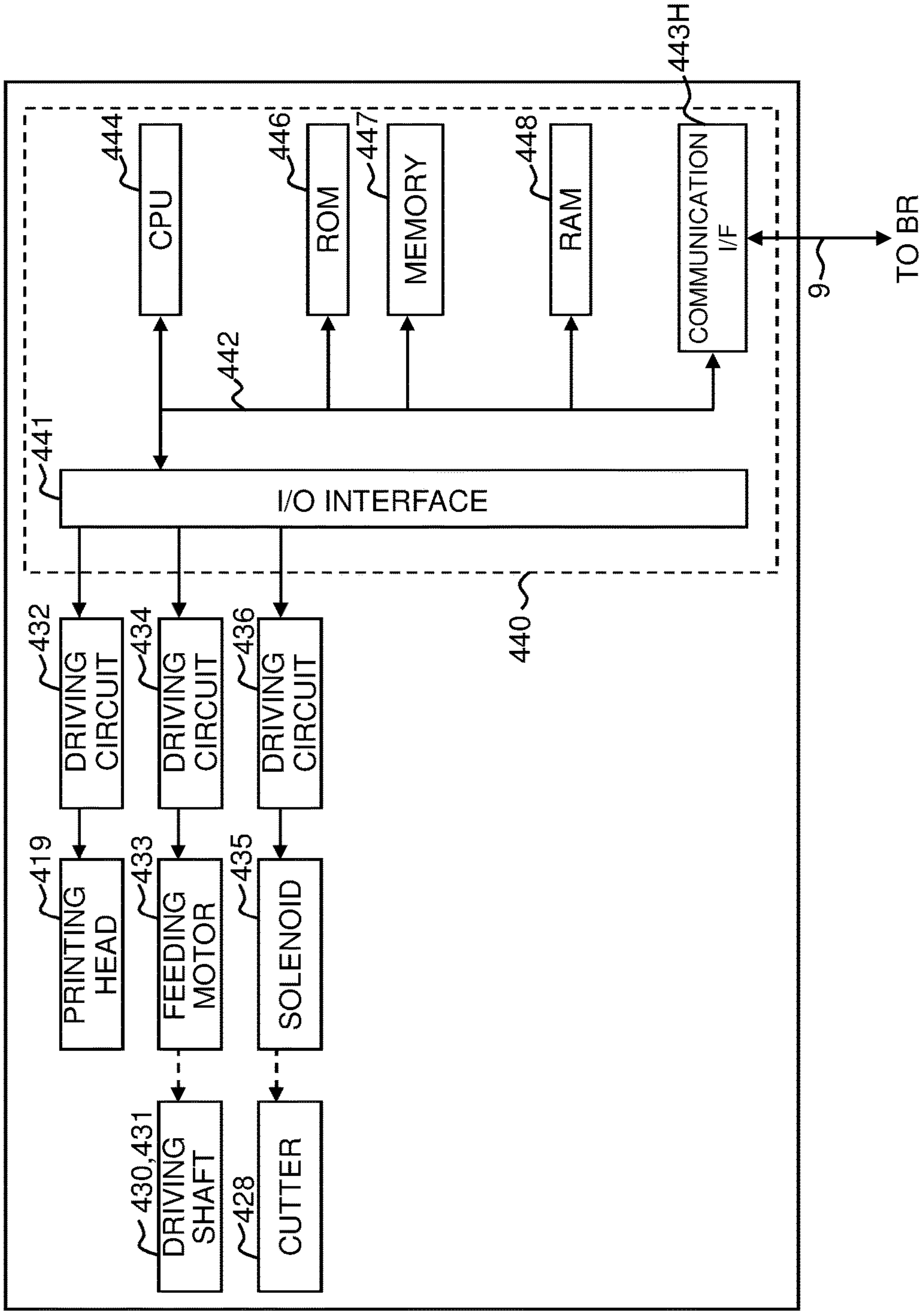

[FIG. 6]
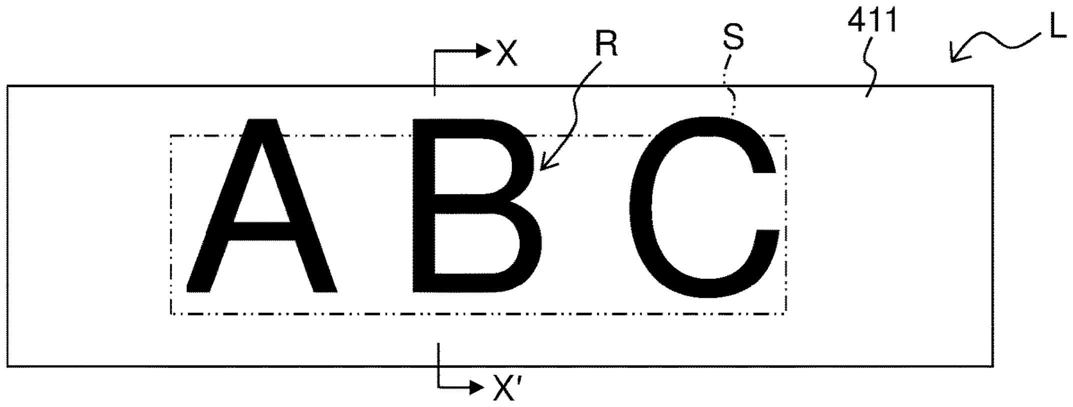
[FIG. 7]
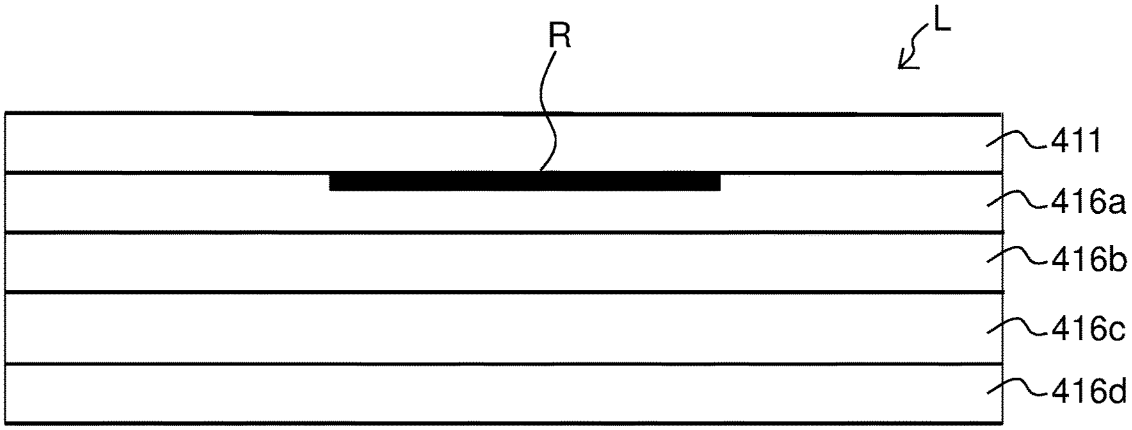

[FIG. 8]
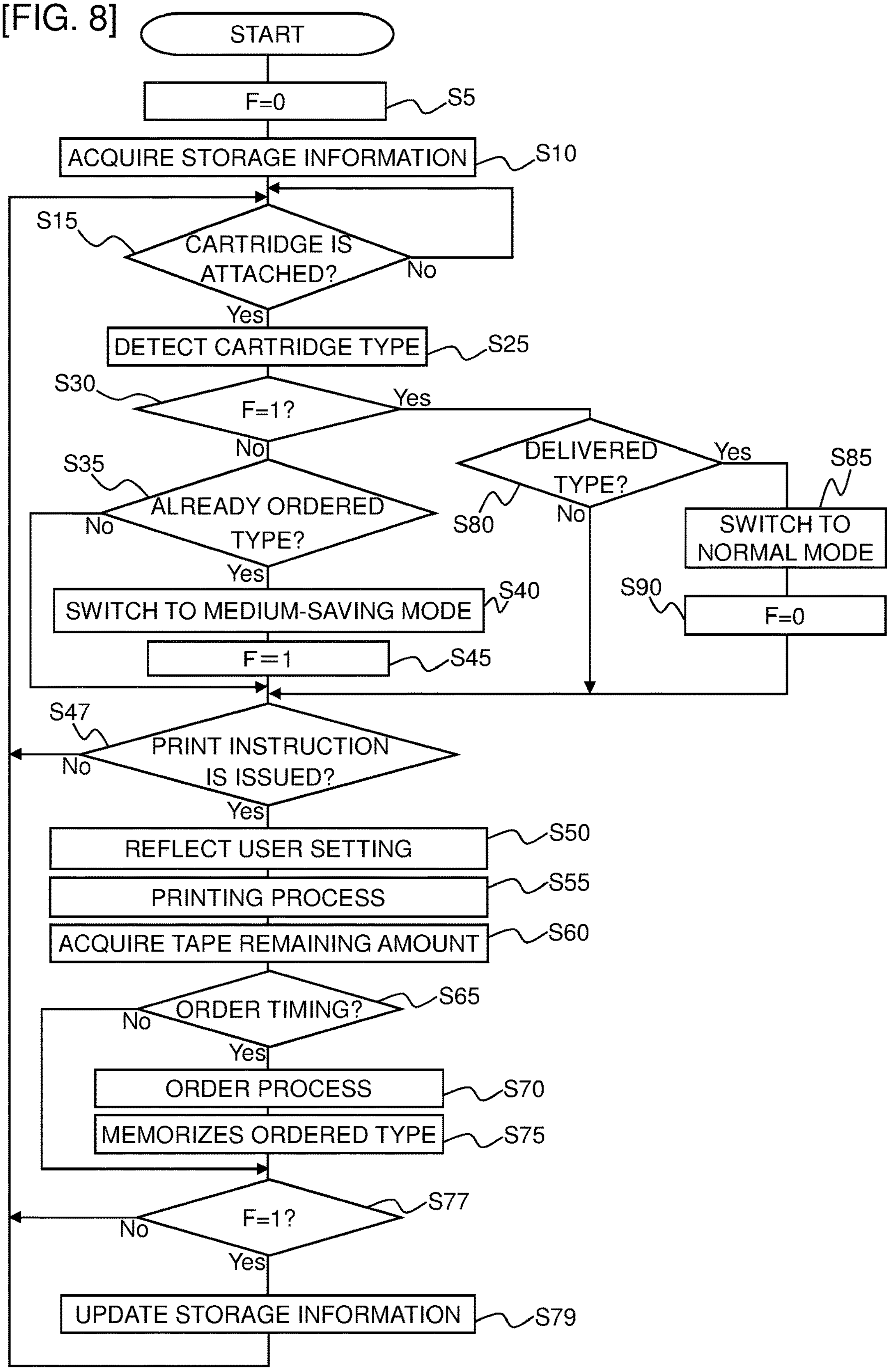

NORMAL MODE
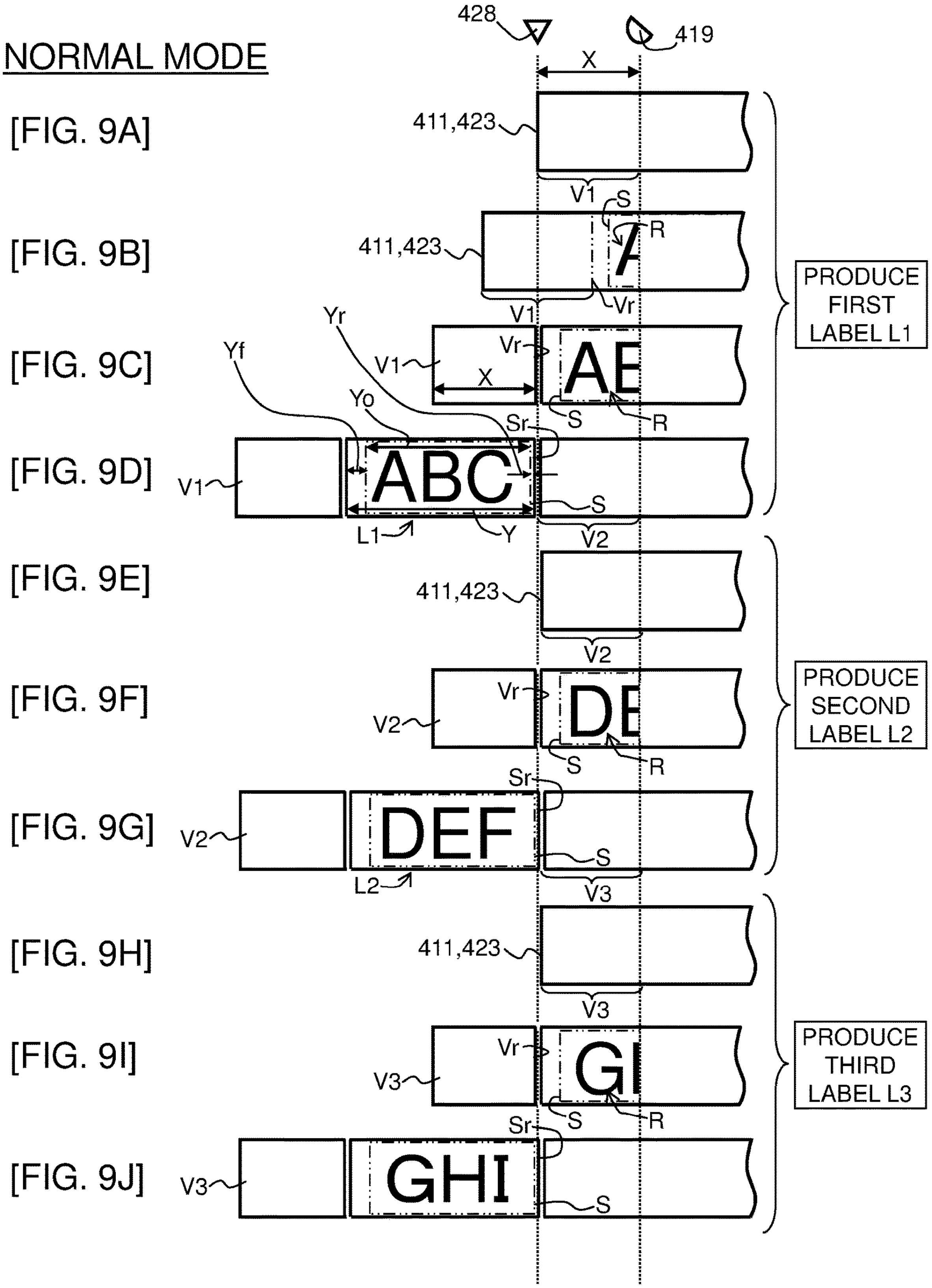

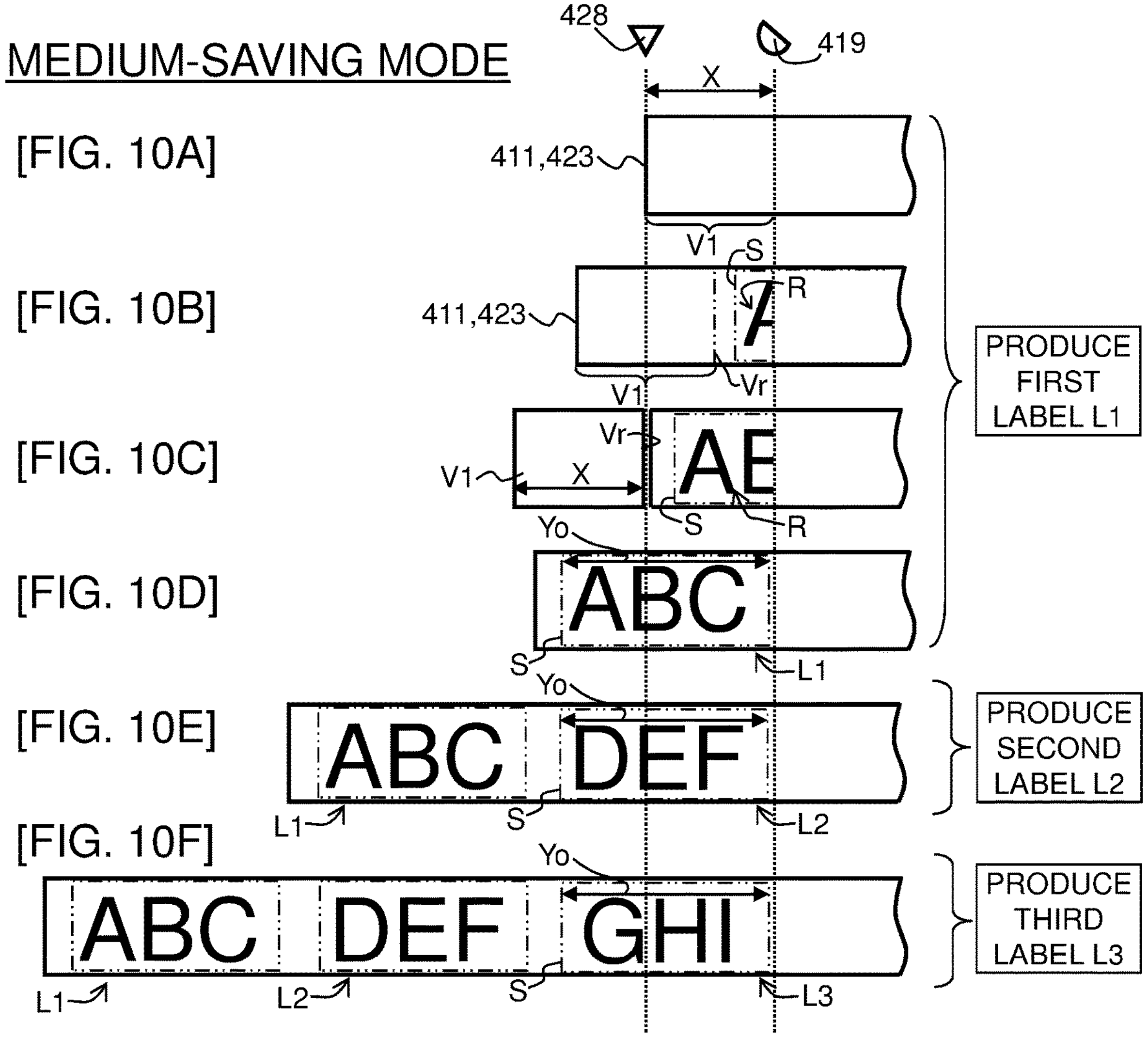
MEDIUM-SAVING MODE
428
419
X
[FIG. 10A]
411,423
V1
S
R
[FIG. 10B]
411,423
V1
Vr
PRODUCE FIRST LABEL L1
[FIG. 10C]
Vr
AE
V1
X
S
R
Yo
[FIG. 10D]
ABC
S
L1
Yo
[FIG. 10E]
ABC
DEF
PRODUCE SECOND LABEL L2
L1
S
L2
[FIG. 10F]
Yo
ABC
DEF
GHI
PRODUCE THIRD LABEL L3
L1
L2
S
L3

[FIG. 11A]
[FIG. 11B]
[FIG. 12A]
[FIG. 12B]
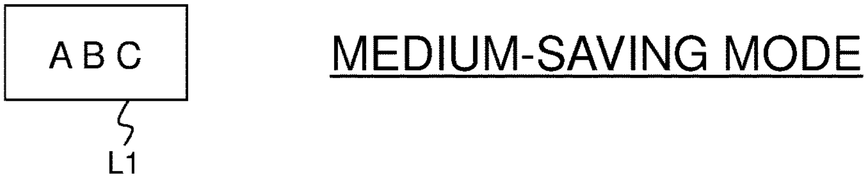
[FIG. 13A]
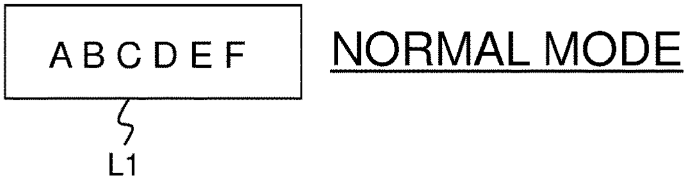
[FIG. 13B]
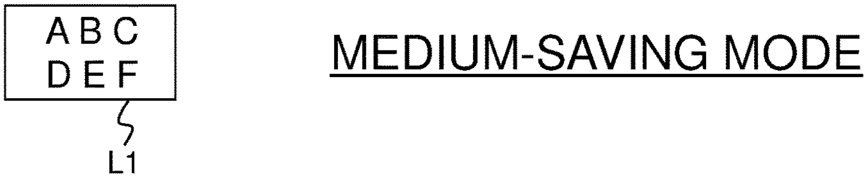

[FIG. 14]
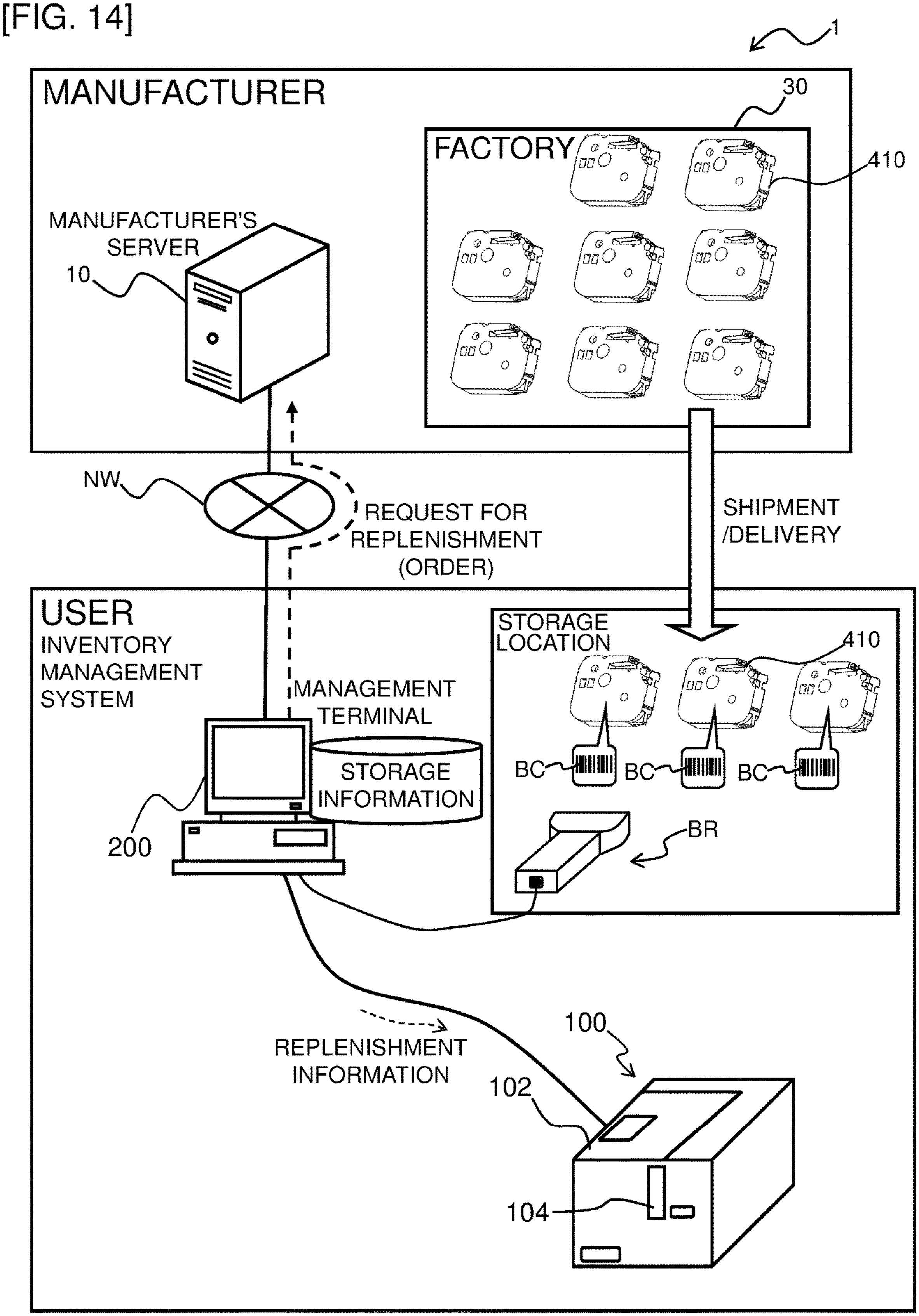

[FIG. 15]
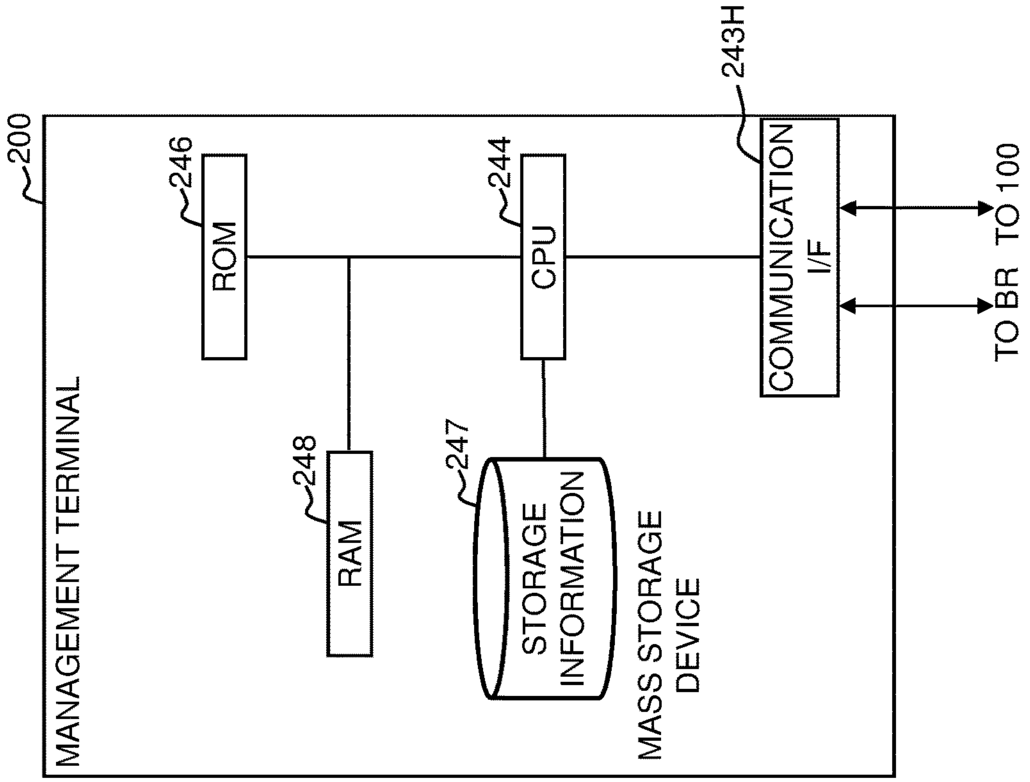

[FIG. 16]
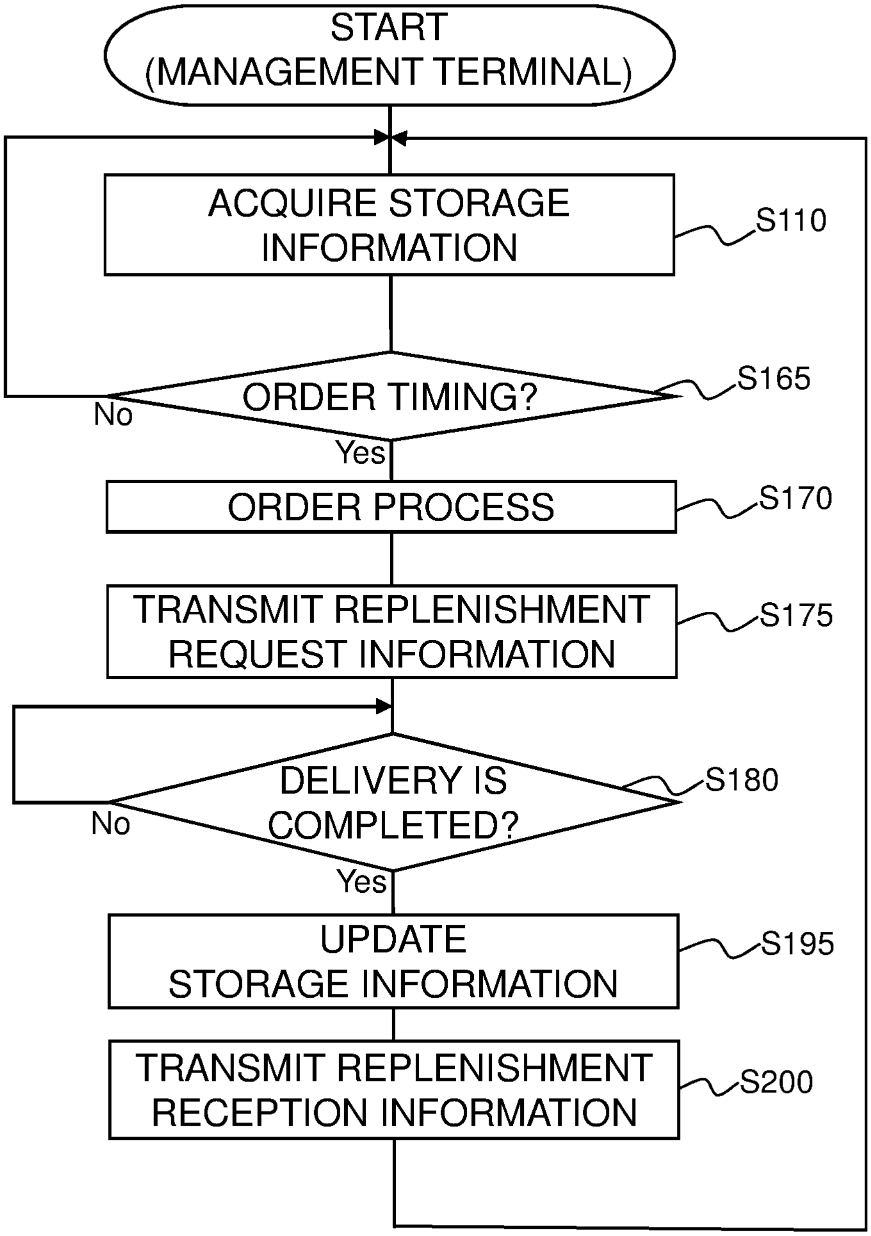

[FIG. 17]
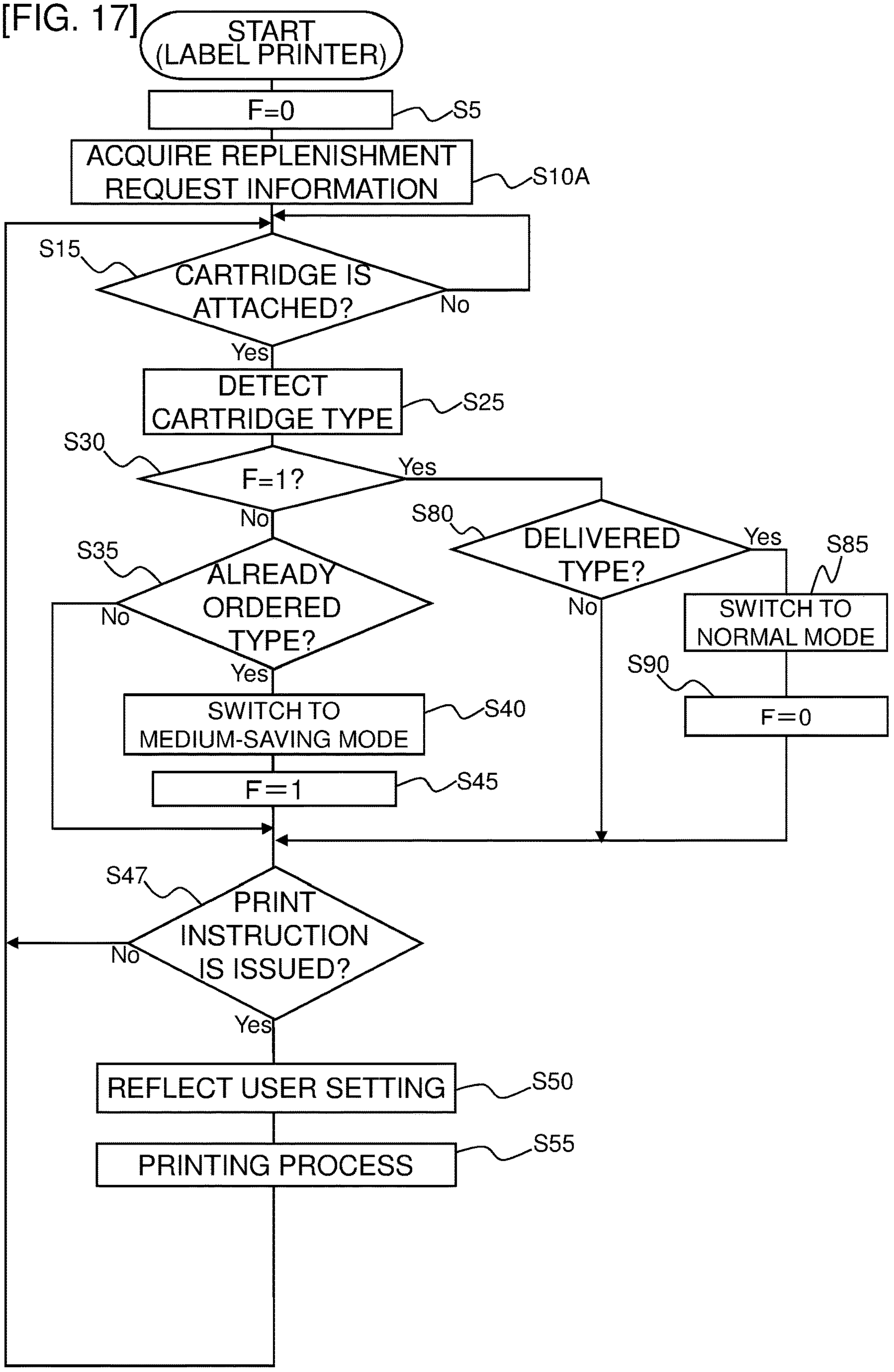

PRINTER AND MEDIUM

CROSS-REFERENCE TO RELATED APPLICATION

The present application claims priority from Japanese Patent Application No. 2017-217301, which was filed on Nov. 10, 2017, the disclosure of which is incorporated herein by reference in its entirety.

BACKGROUND

Field

The present disclosure relates to a printer performing printing by using a storage body storing a print-receiving medium and a medium storing a printing processing program and a storage body management program.

In a printer, a print is formed on a print-receiving medium by a printing head to form a printed matter. As the printed matter is successively formed, the print-receiving medium is gradually consumed, and finally, the printable print-receiving medium runs out. In that case, a new print-receiving medium is attached to the printer and the formation of printed matter is continued. In this way, the print-receiving medium (=consumables) is sequentially consumed by continuing the printed matter formation. Prior arts are already known in which a consumption status of such consumables of the printer is managed so that a manufacturer accepts a request (=order) for replenishment of the consumables in the case of insufficiency in quantity.

However, even though a request is made for the replenishment of the consumables (print-receiving medium) as described above, the print-receiving medium is not necessarily promptly delivered to the user side and may take relatively long time to arrive in some situations. In such a case, the remaining print-receiving medium may be exhausted before arrival of the print-receiving medium and may make it unable to produce a desired printed matter.

SUMMARY

An object of the present disclosure is to provide a printer and a medium capable of preventing a print-receiving medium from being exhausted before arrival even through it takes time to arrive after ordering a new print-receiving medium.

In order to achieve the above-described object, according to the aspect of the present application, there is provided a printer configured to perform printing, comprising an attaching part configured to attach a storage body storing a print-receiving medium in a suppliable manner, a feeder configured to feed the print-receiving medium supplied from the storage body attached to the attaching part, a printing head configured to form a printed matter by forming a desired print object onto the print-receiving medium fed by the feeder, and a CPU configured to control the feeder and the printing head in a predetermined control mode, the CPU executing a detection process for detecting a type of the storage body attached to the attaching part, a first determination process for determining on the basis of a detection result in the detection process whether the type of the storage body attached to the attaching part is a first type in an ordering state associated with insufficiency in quantity or a second type other than the first type, and a first mode switching process for, in the case that the type is determined as the first type in the first determination process, switching the control mode for controlling the feeder and the printing head from a normal mode prepared in advance correspondingly to the second type to a medium-saving mode prepared in advance correspondingly to the first type for reducing a consumption amount of the print-receiving medium than the normal mode.

BRIEF DESCRIPTION OF THE DRAWINGS

FIG. 1 is a diagram showing an overall schematic configuration of a management system according to an embodiment of the present disclosure.

FIG. 2 is a configuration diagram showing a label printer together with a barcode reader.

FIG. 3 is a perspective view showing an appearance configuration of a cartridge holder inside a housing of the label printer and a cartridge to be attached thereto.

FIG. 4 is a view showing a peripheral portion of a cartridge holder in a cartridge-attached state together with the cartridge.

FIG. 5 is a functional block diagram showing a functional configuration of the label printer.

FIG. 6 is a plane view showing an example of an appearance of a print label.

FIG. 7 is a view acquired by rotating a cross-sectional view taken along a line X-X' of FIG. 6 by 90° counterclockwise.

FIG. 8 is a flowchart showing a control procedure executed by a CPU of the label printer.

FIG. 9A is an explanatory view showing an example of a flow of production of a print label in a normal mode.

FIG. 9B is an explanatory view showing an example of a flow of production of a print label in a normal mode.

FIG. 9C is an explanatory view showing an example of a flow of production of a print label in a normal mode.

FIG. 9D is an explanatory view showing an example of a flow of production of a print label in a normal mode.

FIG. 9E is an explanatory view showing an example of a flow of production of a print label in a normal mode.

FIG. 9F is an explanatory view showing an example of a flow of production of a print label in a normal mode.

FIG. 9G is an explanatory view showing an example of a flow of production of a print label in a normal mode.

FIG. 9H is an explanatory view showing an example of a flow of production of a print label in a normal mode.

FIG. 9I is an explanatory view showing an example of a flow of production of a print label in a normal mode.

FIG. 9J is an explanatory view showing an example of a flow of production of a print label in a normal mode.

FIG. 10A is an explanatory view showing an example of a flow of production of a print label in a medium-saving mode.

FIG. 10B is an explanatory view showing an example of a flow of production of a print label in a medium-saving mode.

FIG. 10C is an explanatory view showing an example of a flow of production of a print label in a medium-saving mode.

FIG. 10D is an explanatory view showing an example of a flow of production of a print label in a medium-saving mode.

FIG. 10E is an explanatory view showing an example of a flow of production of a print label in a medium-saving mode.

FIG. 10F is an explanatory view showing an example of a flow of production of a print label in a medium-medium-saving mode.

FIG. 11A is an explanatory view of the case that a length of an inter-character space is shortened between adjacent characters in the medium-saving mode.

FIG. 11B is an explanatory view of the case that a length of an inter-character space is shortened between adjacent characters in the medium-saving mode.

FIG. 12A is an explanatory view of the case that a character font is changed in the medium-saving mode.

FIG. 12B is an explanatory view of the case that a character font is changed in the medium-saving mode.

FIG. 13A is an explanatory view of the case that a character string is divided into multiple lines in the medium-saving mode.

FIG. 13B is an explanatory view of the case that a character string is divided into multiple lines in the medium-saving mode.

FIG. 14 is a diagram showing an overall schematic configuration of a management system according to a modification example in which a management terminal is disposed.

FIG. 15 is a functional block diagram showing a functional configuration of the management terminal.

FIG. 16 is a flowchart showing a control procedure executed by the management terminal.

FIG. 17 is a flowchart showing a control procedure executed by the CPU of the label printer.

DETAILED DESCRIPTION OF THE PREFERRED EMBODIMENTS

An embodiment of the present disclosure will now be described with reference to the drawings.

<System Configuration Overview>

FIG. 1 is a diagram showing an overall schematic configuration of a management system according to this embodiment.

In FIG. 1, a management system 1 (corresponding to an example of a storage body management system) includes a management server 10 owned by a manufacturer (corresponding to an example of a supplier), a label printer 100 owned by a user (corresponding to an example of a printer). The management server 10 and the printer 100 are connected such that information can be transmitted to/received from each other through a network NW such as a communication network, for example.

In this example, the management server 10 is disposed in a factory 30 of a manufacturer that manufactures cartridges 410 described later. The present disclosure is not limited to the factory 30, and the server may be disposed in a warehouse etc. storing the cartridges 410. The present disclosure is not limited to the manufacturer, and the server may be disposed in a site of a vendor, a dealer, etc. selling the cartridges 410. Therefore, the management server 10 may be disposed in a facility from which the type and the number of the cartridges 410 can be shipped in accordance with details of an order from the label printer 100 described later. Alternatively, the present disclosure is not limited to those disposed in the facility, and the management server 10 may be disposed in a place different from the facility such that the server can recognize the status of the facility as needed and can give a shipping instruction.

The label printer 100 has a function of accessing the management server 10 via the network NW to enable transmission/reception of various kinds of information.

FIG. 2 is a configuration diagram showing the label printer together with a bar code reader connected thereto.

As shown in FIG. 2 and FIG. 1, a barcode reader BR is connected to the label printer 100 via a USB cable 9.

The label printer 100 has a housing 101, and an opening/closing lid 102 is disposed on an upper surface portion of the housing 101 such that the lid can be opened and closed (or the lid may be made detachable and attachable). A tape discharging exit 104 is disposed in a front surface portion of the housing 101. The tape discharging exit 104 is used for discharging a label tape 423 with print (see FIG. 4 described later) produced in the housing 101 to the outside of the housing 101.

The barcode reader BR is disposed in a storage location (e.g., a warehouse, a storeroom) of a plurality of the cartridges 410 (corresponding to an example of storage bodies) usable in the label printer 100 and optically reads information from a barcode BC disposed in each of the cartridges 410. The information (such as cartridge ID defined as identification information of each of the cartridges 410 and type information indicative of the type of the cartridge) read by the barcode reader BR is output to the label printer 100 via the USB cable 9.

FIG. 3 is a perspective view showing an appearance configuration of a cartridge holder inside the housing 101 and a cartridge to be attached thereto with the opening/closing lid 102 of the label printer 100 opened. In FIG. 3, the opening/closing lid 102 opened upward is not shown for avoiding complexity of illustration. FIG. 4 is a view showing a peripheral portion of the cartridge holder in a cartridge-attached state together with the cartridge.

In FIGS. 3 and 4, the label printer 100 includes inside the housing 101 a cartridge holder 427 (corresponding to an example of an attaching part) to which the cartridge 410 can be attached/detached, a printing head 419, a feeding roller driving shaft 430 (corresponding to an example of a feeder), and a ribbon take-up roller driving shaft 431. In this example, the cartridge 410 is a box body formed into a substantially rectangular parallelepiped shape as a whole, and a head insertion opening 439 penetrating both the top and bottom surfaces is formed in a portion thereof.

The cartridge 410 has a base tape roll 417 formed by winding a wound base tape 416, a cover film roll 412 formed by winding a wound cover film 411 that is a print-receiving medium, a ribbon supply side roll 414 feeding out an ink ribbon 413 for print (not necessary if the print-receiving medium is a thermal tape), a ribbon take-up roller 415 taking up the ink ribbon 413 after print, and a feeding roller 418.

The base tape roll 417 has the base tape 416 wound around a base tape spool 417*a*.

The base tape 416 has a laminated structure of multiple layers (four layers in this example) (see a partially enlarged view in FIG. 4). Specifically, from the inner wound side (the right side of the partially enlarged view) toward the opposite side (the left side of the partially enlarged view), the base tape 416 includes an adhesive layer 416*a* made of a suitable adhesive, a tape base layer 416*b* made of PET (polyethylene terephthalate) etc., an adhesive layer 416*c* made of a suitable adhesive, and a separation sheet 416*d* laminated in this order.

The separation sheet 416*d* is a sheet to be peeled off when a finally completed print label (see FIGS. 6, 7, etc. described later) is affixed to an object such as a desired article, so that the label can be affixed by the adhesive layer 416*c* to the object.

The cover film roll 412 has the cover film 411 having substantially the same width as the base tape 416 in this example and wound around a cover film spool 412*a*.

The ribbon supply side roll 414 has the ink ribbon 413 wound around a ribbon supply side spool 414*a*.

The ribbon take-up roller 415 includes a ribbon take-up spool 415*a* and is driven by the ribbon take-up roller driving shaft 431 of the cartridge holder 427 to take up and wind the printed (used) ink ribbon 413 around the ribbon take-up spool 415*a*.

The feeding roller 418 is driven by the feeding roller driving shaft 430 of the cartridge holder 427 to feed the base tape 416 and the cover film 411 in a direction indicated by an arrow T of FIG. 4. while pressing and bonding the tapes into the label tape 423 with print.

The ribbon take-up roller 415 and the feeding roller 418 are rotationally driven in conjunction with each other by a drive force transmitted from a feeding motor 433 (see FIG. 5 described later) that is, for example, a pulse motor provided outside the cartridge 410, through a gear mechanism not shown to the ribbon take-up roller driving shaft 431 and the feeding roller driving shaft 430, respectively.

On the other hand, the cartridge holder 427 has the printing head 419, the ribbon take-up roller driving shaft 431, the feeding roller driving shaft 430, and a roller holder 422.

The printing head 419 has a multiplicity of heat generation elements and forms a print on the cover film 411 fed out and transported from the cover film roll 412.

The feeding roller driving shaft 430 drives the feeding roller 418 to feed the cover film 411 fed out (supplied) from the cover film roll 412 of the cartridge 410 attached to the cartridge holder 427 and the base tape 416 fed out from the base tape roll 417.

The roller holder 422 is pivotally supported by a support shaft 429 and can be switched between a print position and a release position by a switching mechanism. A platen roller 420 and a tape pressure contact roller 421 are rotatably disposed on the roller holder 422 and, when the roller holder 422 is switched to the print position, the platen roller 420 and the tape pressure contact roller 421 are pressed against the printing head 419 and the feeding roller 418.

Additionally, the cartridge holder 427 has a cutter 428 disposed adjacently to a discharging exit (not shown) of the cartridge 410. The cutter 428 is actuated by exciting a solenoid 435 (see FIG. 1 described later) and completely cuts the label tape 423 with print in the thickness direction to generate a print label L described later (see FIG. 6 described later).

In the configuration, after the cartridge 410 is attached to the cartridge holder 427, the ribbon take-up roller driving shaft 431 and the feeding roller driving shaft 430 are rotationally driven in synchronization with each other by the drive force of the feeding motor 433 (see FIG. 5 described later). The driving of the feeding roller driving shaft 430 rotates the feeding roller 418, the platen roller 420, and the tape pressure contact roller 421, and the base tape 416 is fed out from the base tape roll 417 and supplied to the feeding roller 418 as described above. On the other hand, the cover film 411 is fed out from the cover film roll 412, and the multiple heat generation elements of the printing head 419 are energized by a printing head driving circuit 432 (see FIG. 5 described later). In this state, the ink ribbon 413 is pressed against the printing head 419 and thereby brought into contact with the back surface of the cover film 411. As a result, a desired print (mirror image print) is formed in a predetermined print area on the back surface of the cover film 411. The base tape 416 and the cover film 411 after completion of the print are bonded and integrated by the feeding roller 418 and the tape pressure contact roller 421 into the label tape 423 with print, which is transported to the outside of the cartridge 410. The label tape 423 with print is then cut by the cutter 428 to generate the print label (corresponding to a printed matter) having the desired print.

FIG. 5 is a functional block diagram showing a functional configuration of the label printer 100.

In FIG. 5, a control circuit 440 is disposed on a control board (not shown) of the label printer 100. The control circuit 440 is provided with a CPU 444, and the CPU 444 is connected through a data bus 442 to an I/O interface 441, a ROM 446, a memory 447, a RAM 448, and a communication interface 443H. The communication interface 443H is connected through the USB cable 9 to the bar-code reader BR.

The ROM 446 (corresponding to an example of a medium) stores various programs necessary for control (including a printing processing program for executing a control procedure shown in FIG. 8 described later). The CPU 444 executes various calculations based on various programs stored in the ROM 446. The RAM 448 temporarily stores various calculation results etc. calculated by the CPU 444.

The I/O interface 441 is connected to the printing head drive circuit 432 for driving the printing head 419, a feeding motor drive circuit 434, and a solenoid drive circuit 436 driving the solenoid 435.

The feeding motor drive circuit 434 drives the feeding motor 433 to drive the feeding roller driving shaft 430 and the ribbon take-up roller driving shaft 431 described above, thereby transporting the base tape 416, the cover film 411, and the label tape 423 with print.

The solenoid drive circuit 436 excites the solenoid 435 driving the cutter 428 to perform a cutting operation.

<Example of Print Label>

Description will be made of an example of the print label L formed by completing the cutting of the label tape 423 with print by the print printer 100 as described above, with reference to FIGS. 6 and 7. In FIGS. 6 and 7, the print label L has a five-layer structure in which the cover film 411 is added to the four-layer structure shown in FIG. 4 as described above. Specifically, the cover film 411, the adhesive layer 416*a*, the tape base layer 416*b*, the adhesive layer 416*c*, and the separation sheet 416*d* are included as the five layers from the cover film 411 side (the upper side of FIG. 7) toward the opposite side (the lower side of FIG. 7). In this example, a desired print R (characters "ABC" in this example. corresponding to an example of a print object) is printed on a print area S (specifically, a back side thereof) included in the cover film 103.

<Main Part of Embodiment>

As described above, the cartridge 410 is attached to the label printer 100, the base tape 416 and the cover film 411 supplied from the cartridge 410 are fed, and the print object is formed on the fed cover film 411 to form the print label L. As the print labels L are sequentially formed in this manner, the cover film 411 is gradually consumed (together with the base tape 416). Although neither shown in the figures nor described in detail, the label printer 100 has a known appropriate remaining amount detection mechanism (e.g., a mechanism detecting and accumulating an amount of feeding of the cover film 411, detecting a change in outer diameter of the cover film roll 412 etc., or detecting a change in the number of rotations of the cover film roll 412) that detects a remaining amount (or a use amount. the same applies hereinafter) of the cover film 411 in the cartridge 410. As a result of the consumption, finally, the printable cover film 411 in the cartridge 410 runs out. In this case, a new cartridge 410 of the same type stocked in the storage location is attached to the cartridge holder 427, and the production of the print label L is continued. In this way, by continuing the production of the print label L, the cartridge 410 of the corresponding type is sequentially consumed.

As described above, in this embodiment, such a consumption status of the cartridge 410 is managed by the label printer 100. Specifically, in the storage location, multiple types of the cartridges 410 are stocked in advance for use in the label printer 100. The types and the numbers of these stocked cartridges 410 are registered in the label printer 100 by reading with the barcode reader BR (described in detail later). When a certain type of the cartridge 410 becomes insufficient in quantity due to the consumption as described above, the label printer 100 requests the management server 10 on the manufacturer side to deliver the cartridges 410 of the type for replenishment (=order).

However, even though the request is made for the replenishment, the cartridge 410 of the type is not necessarily rapidly delivered to the user and it may take a relatively long time until arrival of the cartridge 410 in some situations. Therefore, in this embodiment, a normal mode and a medium-saving mode for suppressing consumption amounts of the cover film 411 and the base tape 416 are prepared in advance as control modes performed by the CPU 444 for controlling the feeding operation of the feeding roller driving shaft 430 and the print operation of the printing head 419. In the case that the cartridge 410 attached to the cartridge holder 427 is of the type expected to arrive due to the order, the normal mode is switched to the medium-saving mode. Details of the technique will be described with reference to a flowchart of FIG. 8 showing a control procedure executed by the CPU 444.

<Control Flow>

In FIG. 8, first, at step S5, the CPU 444 initializes a flag F indicative of switching to the medium-saving mode to 0. Subsequently, the procedure goes to step S10.

At step S10, the CPU 444 acquires storage information of the cartridges 410 in the storage location. Specifically, when a plurality of the cartridges 410 is received from the factory, the barcodes BC of all the cartridges 410 are read by the barcode reader BR. On the basis of the reading result, the CPU 444 acquires the storage information indicative of how many cartridges 410 of what type are stored in the storage location (in the case that one of the cartridges 410 is already attached to the cartridge holder 427, the cartridge 410 may be included). The process executed at step S10 corresponds to an example of a storage information acquisition process described in claims. Subsequently, the procedure goes to step S15.

At step S15, the CPU 444 determines whether or not the cartridge 410 is attached to the cartridge holder 427 by a known method. Although neither shown in the figures nor described in detail, for example, the cartridge holder 427 is provided with a contact or non-contact sensor capable of detecting that the cartridge 410 is attached, and the CPU 444 makes the determination on the basis of the detection result of the sensor. After waiting in a loop while the determination is negative (S15:NO) until the cartridge 410 is attached to the cartridge holder 427, and if the cartridge 410 is attached, the determination becomes affirmative (S15:YES), and the procedure goes to step S25.

At step S25, the CPU 444 detects the type of the cartridge 410 attached to the cartridge holder 427 by a known method. Although neither shown in the figures nor described in detail, for example, similar to the above description, the cartridge holder 427 is provided with a contact or non-contact sensor capable of detecting the type of the cartridge 410, and the CPU 444 acquires the type of the cartridge 410 on the basis of the detection result of the sensor. Step S25 corresponds to an example of a detection step described in claims, and the process executed at step S25 corresponds to an example of a detection process described in claims. This sensor and the sensor used at step S15 may be the same sensor. In this case, the cartridge attachment determination may be made at the timing of step S25, or conversely, the cartridge type may be acquired at the timing of step S15. Subsequently, the procedure goes to step S30.

At step S30, the CPU 444 determines whether or not the flag F is 1. F=0 is maintained and the determination is negative (S30:NO) until F=1 is set at step S45 described later, and the procedure goes to step S35.

At step S35, the CPU 444 determines whether the type of the cartridge 410 detected at step S25 is the type (corresponding to an example of a first type) ordered to the management server 10 or another type (corresponding to an example of a second type). Step S35 corresponds to an example of a determination step described in claims, and the process executed at step S35 corresponds to an example of a first determination process described in claims. The determination is negative (S35:NO) until the order is made at step S70 described later, and the procedure goes to step S47.

At step S47, the CPU 444 determines, for example, through an appropriate operation part disposed on the label printer 100, whether or not a print instruction is issued by the user. The determination is negative (S47:NO) until a print instruction is issued, and the procedure returns to step S15 to repeat the same procedure. If a print instruction is issued, the determination becomes affirmative (S47:YES), and the procedure goes to step S50.

At step S50, the CPU 444 accepts various settings from the user. At the start of this flow, the control mode for controlling the feeding operation of the feeding roller driving shaft 430 and the print operation of the printing head 419 is set to the normal mode rather than the medium-saving mode; however, in the case that various corrections are made by the user, the details of setting are accepted at step S50, and the details of corrections are reflected (not described in detail). In the case that no correction is made by the user, step S50 is omitted. Subsequently, the procedure goes to step S55.

At step S55, the CPU 444 executes a printing process to produce the print label L. Specifically, as described above, while the cover film 411 and the base tape 416 are fed, the desired print object (the print R in the example described above) is formed on the cover film 411 by the printing head 419 to generate the label tape 423 with print. The label tape 423 with print is cut by the cutter 428 as necessary (described in detail later). Through these processes, the print label L including the print object is generated. Subsequently, the procedure goes to step S60.

At step S60, the CPU 444 acquires the remaining amount of the cover film 411 (or the base tape 416) of the cartridge 410 detected by the remaining amount detection mechanism described above is acquired. To achieve the objective described above, the remaining amount may be acquired during the printing process at step S55. The process executed at step S60 corresponds to an example of a remaining amount information acquisition process described in claims. Subsequently, the procedure goes to step S65.

At step S65, on the basis of the storage information acquired at step S10 and the remaining amount information acquired at step S60, the CPU 444 determines whether or not a predetermined order timing has come for the type of the cartridge 410 attached to the cartridge holder 427. An example of the order timing is, for example, when the cartridge 410 attached to the cartridge holder 427 is the last one out of the total number of the cartridges 410 of the type acquired at step S10 (e.g., the tenth one out of the total of the ten cartridges 410. it is assumed that the order of use of the ten cartridges 410 is determined in advance) and the remaining amount of the cover film 411 in the cartridge 410 is equal to or less than a predetermined threshold value (e.g., the remaining amount of 30 meters). Alternatively, regardless of the remaining amount information, the timing of the attachment of the last cartridge 410 may be defined as the order timing. Alternatively, the cartridge may not be the last one as described above and may have an appropriate number before the last.

In the case that the order timing has not yet come, the determination is negative (S65:NO), and the procedure goes to step S77.

At step S77, similarly to step S30, it is determined whether or not the flag F is 1. F=0 is maintained and the determination is negative (S30:NO) until F=1 is set at step S45 described later, and the procedure returns to step S15 to repeat the same procedure. In this way, until the order timing has come, the flow is repeated through steps S65→S77→S15→S25→S30→S35→S47→S50→S55→S60→S65 etc. and the print labels L are sequentially produced in accordance with the print instruction.

In the repetition described above, the determination of step S65 becomes affirmative (S65:YES) when the order timing comes, and the procedure goes to step S70. At step S70, the CPU 444 requests the management server 10 via the network NW to deliver the cartridges 410 of the type attached to the cartridge holder 427 (order). The process executed at step S70 corresponds to an example of a replenishment request process described in claims. Subsequently, the procedure goes to step S75.

At step S75, the CPU 444 memorizes the type of the cartridges 410 ordered at step S70 in an appropriate place (e.g., the memory 447). Subsequently, the procedure goes through step S77 to step S15 to repeat the same procedure. In the case that the cartridge 410 of the order made as described above is continuously attached and used in the cartridge holder 427 without change (the same applies to the case that the cartridge 410 of the order is temporarily removed from the cartridge holder 427 and subsequently attached again to the cartridge holder 427), the determination of step S35 becomes affirmative after returning to steps S15→S25→S30, and the procedure goes to step S40.

At step S40, the CPU 444 switches the control mode from the current normal mode (see FIG. 9 etc. described later for details) to the medium-saving mode (see FIG. 10 etc. described later for details). Step S40 corresponds to an example of a mode switching step described in claims, and the process executed at step S40 corresponds to an example of a first mode switching process described in claims. Subsequently, the procedure goes to step S45.

At step S45, the CPU 444 sets the flag F=1. Subsequently, after going through steps S47 and S50 and executing the printing process in the medium-saving mode at step S55, the determination of step S65 after step S60 is negative (since the order timing has already come and the order has been made), the determination of step S77 is affirmative (S77:YES) since F=1 is set as described above, and the procedure goes to step S79.

At step S79, the CPU 444 updates the storage information of the cartridge 410 in the storage location. Specifically, when the cartridge 410 ordered as described above has been safely delivered and has arrived, the barcode BC on the cartridge 410 having arrived is read by the barcode reader BR. On the basis of the reading result, the CPU 444 updates the storage information and returns to step S15. If the ordered cartridge 410 has not yet arrived, this procedure is omitted, and the procedure directly returns to step S15. Among the processes executed at step S79, collection of information indicative of whether or not the barcode BC is read corresponds to an example of a resolution information acquisition process described in claims. Subsequently, after goring through steps S15→S20, the determination of step S30 becomes affirmative (S30:YES) since F=1 is set as described above, and the procedure goes to step S80.

At step S80, the CPU 444 determines whether or not the cartridge type detected at step S25 is the type delivered after the order process executed at step S70 (in other words, whether or not the ordered cartridge 410 has been safely delivered and attached). This process corresponds to an example of a second determination process described in claims. If the type is not the delivered type (in other words, if the delivery of the cartridge 410 is not yet completed), the determination is negative (S80:NO), and the procedure goes to step S47 to repeat the same procedure. While the delivery is not completed, steps S15→S25→S30→S80→S47→S50→S55→S60→S65→S77→(execution of step S79 is omitted)→Step S15 etc. are repeated to produce the print label L in the medium-saving mode.

In the repetition described above, the determination of step S80 becomes affirmative (S80:YES) when the delivery is completed, and the procedure goes to step S85. At step S85, the CPU 444 switches (returns) the control mode from the current medium-saving mode to the normal mode. The process executed at step S85 corresponds to an example of a second mode switching process described in claims. Subsequently, the procedure goes to step S90.

At step S90, the CPU 444 returns the flag F to 0. Subsequently, the procedure returns to step S47 to repeat the same procedure.

<Two Control Modes>

The two control modes, i.e., the normal mode and the medium-saving mode, will be described with reference to FIGS. 9 and 10.

<Normal Mode>

First, an example of a flow of production of the print label L in the normal mode will be described with reference to FIG. 9.

FIG. 9A corresponds to a state before start of generation of the print label L. In this state, since a rear end portion of a previously generated print label L (not shown) is cut by the cutter 428, the label tape 423 with print including the cover film 411 (hereinafter simply referred to as a "tape 411, 423". the same applies to the figures) has a tip end located at a position facing the cutter 428.

In this state, the generation of the print label L is started by using print data of a character string "ABC". Specifically, first, the feeding of the tape 411, 423 is started by the feeding roller 418 etc. When the transport directional position of the tape 411, 423 reaches a position at which the printing head 419 faces the print area S, the printing head 419 starts forming the print R composed of a character string "ABC" in the print area S (see FIG. 9B). In this case, the cutter 428 is located downstream of the printing head 419 along the transport path, and a predetermined separation distance X exists between the printing head 419 and the cutter 428. Consequently, at the start of production of the print label L shown in FIG. 9A, a margin area V1 is generated as a margin portion in which a new print cannot be formed (in other words, the length of the margin area V1 has the same value as the distance X. the same applies to margin areas V2, V3, etc. described later).

Correspondingly, after the production of the print label L is started as described above and the formation of the print R to the print area S is started (FIG. 9B), when a rear end portion Vr of the margin area V1 faces the cutter 428 (see FIG. 9C. in other words, when the feeding is performed by a feeding distance corresponding to the separation distance X), the feeding and the formation of the print R are stopped. In this example, the print formation is interrupted in the middle of formation of the character "B" in the character string "ABC". After the stop of feeding/print formation, the tape 411, 423 is cut at the rear end portion Vr of the margin area V1 by the cutter 428 (see FIG. 9C), so that the margin area V1 is separated from the subsequent tape 411, 423 and discharged.

Subsequently, the feeding and the formation of the print R is restarted, and after the print R (the character string "ABC") is completely formed onto the print area S, the feeding of the tape 411, 423 is further continued, and the feeding is stopped when a rear end portion Sr of the printing area S faces the cutter 428. The tape 411, 423 are cut by the cutter 428 at the rear end portion Sr of the print area S (see FIG. 9D), so that the print area S is separated from the subsequent tape 411, 423 and discharged. As a result, the formation of the print label L1 (a first label in this description) including the print R of "ABC" is completed. The print label L1 has a length Y slightly larger than a length Yo of the print area S in the transport direction as a whole and further includes a so-called front margin (corresponding to an example of a first non-print portion) of a length Yf on the downstream side in the transport direction of the print area S along with a so-called rear margin (corresponding to an example of a first non-print portion) of a length Yr on the upstream side in the transport direction of the print area S.

Subsequently, for example, the generation of a print label is started by using print data of a character string "DEF". Specifically, after the feeding of the tape 411, 423 is started as described above (see FIG. 9E) and the formation of the print R of the character string "DEF" is started in the print area S by the printing head 419, when the feeding is performed by the separation distance X and the rear end portion Vr of the next margin area V2 faces the cutter 428, the feeding is stopped, and the tape 411, 423 is cut as described above. Subsequently, the feeding of the tape and the formation of the print R is resumed, and when the rear end portion Sr of the print area S faces the cutter 428 (see FIG. 9G), the feeding is stopped, and the tape 411, 423 is cut by the cutter 428, separated from the subsequent tape, and discharged. As a result, the production of a second print label L2 including the print R of "DEF" is completed. The print label L2 also has the same length Y as described above.

Subsequently, for example, the generation of a print label is started by using print data of a character string "GHI". Specifically, after the feeding of the tape 411, 423 is resumed as described above (see FIG. 9H) and the formation of the print R of the character string "GHI" is started in the print area S by the printing head 419, when the feeding is performed by the separation distance X and the rear end portion Vr of the next margin area V3 faces the cutter 428, the feeding is stopped, and the tape 411, 423 is cut as described above. Subsequently, the feeding of the tape and the formation of the print R is resumed, and when the rear end portion Sr of the print area S faces the cutter 428 (see FIG. 9J), the feeding is stopped, and the tape 411, 423 is cut by the cutter 428, separated from the subsequent tape, and discharged. As a result, the production of a third print label L3 including the print R of "GHI" is completed. The print label L3 also has the same length Y as described above.

Subsequent label production is performed in the same flow and therefore will not be illustrated or described in detail.

In the case that the print labels L1, L2, L3, etc. are produced by the technique of the normal mode shown in FIGS. 9A to 9K, when the formation of the print label L1 is completed (see FIG. 9D), when the formation of the print label L2 is completed (see FIG. 9G), when the formation of the print label L3 is completed (see FIG. 9J), etc., the margin areas V1, V2, V3 of the distance X (corresponding to an example of a gap dimension between adjacent printed matters) left unprinted on the downstream side in the transport direction of the respective print labels L1, L2, L3 are wastefully discharged together.

<Medium-Saving Mode>

An example of a flow of production of the print label L in the medium-saving mode, i.e., a feature of this embodiment, will be described with reference to FIG. 10 corresponding to FIG. 9.

First, FIGS. 10A to 10C are almost the same as FIGS. 9A to 9C of the normal mode. Specifically, when the generation of the print label is started by using the print data of the character string "ABC", the feeding of the tape 411, 423 is started. When the transport directional position of the tape 411, 423 reaches a position at which the printing head 419 faces the print area S, the formation of the print R of the character string "ABC" is started in the print area S. When the rear end portion Vr of the margin area V1 faces the cutter 428 (in other words, during the formation of the print R in the print area S. see FIG. 10B), the feeding and the formation of the print R are stopped, and the tape 411, 423 is cut at the rear end portion Vr by the cutter 428, so that the margin area V1 is separated and discharged (see FIG. 10B). As described above, the length of the margin area V1 is the same as the separation distance X.

Subsequently, the feeding and the formation of the print R are resumed, and the formation of the print R (the character string "ABC") onto the print area S is completed (when the feeding of the length Yo is completed after the start of print formation of FIG. 10A). In this medium-saving mode, the generation of the print label L1 of the character string "ABC" is completed at this time point. Specifically, in this medium-saving mode, to avoid wasteful generation of the margin area V2 following the print area S in the normal mode, the feeding is not performed for causing the rear end portion Sr of the print area S to face the cutter 428 as described with reference to FIG. 9D. In other words, the feeding of the tape 411, 423 is kept stopped in the state of FIG. 10D unless the generation instruction of the print label of the next character string "DEF" is issued (in this case, the print label L1 of the character string "ABC" cannot be taken out).

Subsequently, from the state of FIG. 10D, the generation of the print label using the print data of the next character string "DEF" is immediately performed, so that the feeding of the tape 411, 423 is started as described above, and after the printing head 419 starts forming the print R of the character string "DEF" in the print area S, as described above, when the feeding of the length Yo is completed after the start of formation of the print R of FIG. 10A, the formation of the print R (the character string "DEF") onto the print area S is completed (see FIG. 10E), and the generation of the print label L2 including the character string "DEF" is completed. As in the above description, unless the generation instruction of the print label of the next character string "GHI" is issued, the feeding of the tape 411, 423 is kept stopped in the state of FIG. 10E, and the print label L2 of the character string "DEF" cannot be taken out.

Subsequently, from the state of FIG. 10E, the generation of the print label using the print data of the next character string "GHI" is immediately performed, so that the feeding of the tape 411, 423 is started as described above, and after the printing head 419 starts forming the print R of the character string "GHI" in the print area S, as described above, when the feeding of the length Yo is completed after the start of formation of the print R of FIG. 10E, the formation of the print R (the character string "GHI") onto the print area S is completed (see FIG. 10F), and the generation of the print label L3 including the character string "GHI" is completed. As in the above description, unless the generation instruction of the print label of the next character string "JKL" (not shown) is issued, the feeding of the tape 411, 423 is kept stopped in the state of FIG. 10F, and the print label of the character string "GHI" cannot be taken out.

Subsequent label production is performed in the same flow and therefore will not be illustrated or described in detail.

In the medium-saving mode, out of the print labels L1, L2, L3, etc. successively generated as described above, the label appearing outside the housing 101 from the tape discharging exit 104 of the housing 101 can be cut with scissors etc. to obtain the print labels L1, L2, L3, etc. in a respectively separated form. In the example, for example, in the state of FIG. 10E, the print label L1 of the character string "ABC" is exposed from the tape discharging exit 104 to the outside of the housing 101 and can be cut with scissors to obtain the print label L1. For example, in the state of FIG. 10F, the print label L1 of the character string "ABC" and the print label L2 of the character string "DEF" are exposed from the tape discharging exit 104 to the outside of the housing 101 and can be cut with scissors to obtain the print labels L1, L2.

As shown in FIGS. 10A to 10F, in this medium-saving mode, the margin areas V2, V3, etc. left unprinted on the downstream side in the transport direction of the respective print labels L2, L3, L3 in the normal mode are not generated, so that the consumption of the cover film 411 and the base tape 416 can accordingly be reduced as compared to the normal mode.

In the flow of FIGS. 10A to 10F, when the rear end portion Sr of the print area S having "ABC" printed thereon faces the cutter 428 between the state of FIG. 10D and the state of FIG. 10E, the feeding of the tape 411, 423 may be stopped, and the tape 411, 423 may be cut by the cutter 428. In this case, the print label L1 of the character string "ABC" can be separated (from the other portion) by this cutting. Similarly, when the rear end portion Sr of the print area S having "DEF" printed thereon faces the cutter 428 between the state of FIG. 10E and the state of FIG. 10F, the feeding may be stopped for cutting by the cutter 428. The print label L1 of the character string "DEF" can be separated (from the other portion) by this cutting (and so forth).

The present disclosure is not limited to the embodiment and can variously be modified without departing from the spirit and the technical ideas thereof. Such modification examples will hereinafter be described in order. The portions equivalent to those of the embodiment are denoted by the same reference numerals and will not be described or will be described in a simplified manner as needed.

(1) Other Examples of Medium-Saving Mode

The example of the medium-saving mode is not limited to that shown in FIG. 10. For example, as compared to the normal mode, the length may be reduced (including the case of setting to zero) in the front margin (see FIG. 9D) of the length Yf and the rear margin (see FIG. 9D) of the length Yr, which are portions of the print label L other than the print R. Alternatively, as shown in FIGS. 11A and 11B, in the case that the print object is composed of a character string as in the print R, an inter-character space between adjacent characters (corresponding to a second non-print portion. for example, a space between "A" and "B" and between "B" and "C" of the "ABC") may be reduced in the medium-saving mode as compared to the normal mode. Alternatively, as shown in FIGS. 12A and 12B, in the medium-saving mode, the font of characters forming the print R in the normal mode may be changed (in this example, reduced in font size. in other cases, a boldface font, an oblique font, etc. may be canceled) to reduce the length in the transport direction required for the characters. Alternatively, as shown in FIGS. 13A and 13B, in the medium-saving mode, a character string in the normal mode may be divided into multiple lines each extending in the transport direction (so-called multi-line printing) to reduce the length in the transport direction required for the character string.

(2) Case of Disposing Management Terminal on User Side

In the embodiment, the label printer 100 itself acquires the storage information (the quantity of the cartridges 410 in the storage state) and makes a request for replenishes to the manufacturer side on the basis of the remaining amount information of the cartridge 410 attached to the cartridge holder 427. On the other hand, in this modification example, as shown in FIG. 14 corresponding to FIG. 1, a management terminal 200 managing the storage status of the cartridges 410 in the storage location is disposed, and the label printer 100 and the barcode reader BR are connected to the management terminal 200 establish an inventory management system.

The management terminal 200 includes a general-purpose personal computer, has a function of accessing the management server 10 via the network NW to enable transmission/reception of various kinds of information, and is connected through a suitable wired connection (USB cable, LAN cable, etc.) to the barcode reader BR and the label printer 100. In this modification example, the information (such as cartridge ID that is identification information of each of the cartridges 410 and type information indicative of the type of the cartridge) read by the barcode reader BR is output to the management terminal 200 through the wired connection. Additionally, replenishment information (described in detail later) after the order is output from the management terminal 200 through the wired connection to the label printer 100.

FIG. 15 shows a functional configuration of the management terminal 200 in this modification example. As shown in FIG. 15, the management terminal 200 includes a CPU 244 (corresponding to an example of a terminal CPU), a ROM 246 (corresponding to an example of a medium), a mass storage device 247, a RAM 248, and a communication interface 243H. The communication interface 243H is connected to the bar code reader BR and the label printer 100 through the wired connection.

The ROM 246 stores various programs necessary for control (including a program for executing a control procedure shown in FIG. 16 described later). The CPU 244 performs various calculations on the basis of various programs stored in the ROM 246 as described above. The RAM 248 temporarily stores various calculation results etc. calculated by the CPU 244. The mass storage device 247 stores storage information (described in detail later).

FIG. 16 shows a control flow executed by the CPU 244 of the management terminal 200 in this modification example. In FIG. 16, first, at step S110, the CPU 244 acquires the storage information of the cartridges 410 in the storage location. Therefore, similarly to step S10 of FIG. 8, the barcodes BC are read by the barcode reader BR for all the multiple cartridges 410 received from the factory. On the basis of the reading result, the CPU 444 acquires the storage information indicative of how many cartridges 410 of what type are stored in the storage location and stores the storage information in the mass storage device 247. For example, the storage information is acquired (in other words, this flow is executed) once a day, so that when one of the cartridges 410 from the storage location is attached to the cartridge holder 427 as the cartridges 410 are consumed due to the production of the print labels L in the label printer 100, the CPU 244 of the management terminal 200 detects that the number of the cartridges 410 of the type is reduced by one. Step S110 corresponds to an example of a terminal storage information acquisition step described in claims, and the process executed at step S110 corresponds to an example of a terminal storage information acquisition process described in claims. Subsequently, the procedure goes to step S165.

At step S165, on the basis of the storage information acquired at step S110, the CPU 244 determines whether or not a predetermined order timing has come for any type of the cartridges 410. An example of the order timing is, for example, the case that the total number of cartridges 410 of the type acquired at step S101 reaches an appropriate threshold value (e.g., the remaining amount is one), etc. Alternatively, in the case that the order of attachment to the label printer 100 is determined in advance, the order timing may be when the last cartridge 410 is being attached (or has disappeared from the storage location). Alternatively, the cartridge may not be the last one as described above and may have an appropriate number before the last.

After waiting in a loop while the determination is negative (S165:NO) in the case that the order timing has not yet come, the determination becomes affirmative (S165:YES) in the case that the order timing comes, and the procedure goes to step S170.

At step S170, similarly to step S70 of FIG. 8, the CPU 244 requests the management server 10 via the network NW for delivery for replenishment of the cartridges 410 of the type for which the order timing has come at step S165 (order). Step S170 corresponds to an example of a terminal replenishment request step described in claims, and the process executed at step S170 corresponds to an example of a terminal replenishment request process described in claims. Subsequently, the procedure goes to step S175.

At step S175, the CPU 244 transmits replenishment request information (corresponding to an example of replenishment type information) indicative of the type of the cartridges 410 ordered for replenishment to the label printer 100. Step S175 corresponds to an example of a replenishment information transmission step described in claims, and the process executed at step S175 corresponds to an example of a replenishment information transmission process described in claims.

Subsequently, the procedure goes to step S180.

At step S180, the CPU 244 determines whether or not the cartridge 410 ordered at step S180 has been safely delivered and attached. In this determination, whether or not the cartridge 410 has been delivered may be determined by determining whether or not the barcodes BC are read by the barcode reader BR for the received cartridges 410 when the multiple cartridges 410 are received from the factory as in step S110. After waiting in a loop while the cartridge 410 has not been delivered yet (S180:NO), the determination becomes affirmative (S180:YES) when the delivery is completed, and the procedure goes to step S195.

At step S195, the CPU 244 updates the storage information acquired at step S10 and stored in the large-capacity storage device 247 in response to the completion of the delivery. Subsequently, the procedure goes to step S200.

At step S200, the CPU 244 transmits replenishment reception information indicative of completion of delivery with respect to the type of the ordered cartridges 410, to the label printer 100. Subsequently, the procedure returns to step S110 to repeat the same procedure.

FIG. 17 shows a control flow executed by the CPU 444 of the label printer 100 in this modified example. In FIG. 17, after setting F=0 at step S5 as in FIG. 8, at step S10A provided instead of step S10, the CPU 444 receives and acquires the replenishment request information transmitted at step S175 of FIG. 16. The process executed at step S10A corresponds to an example of replenishment information reception process described in claims and also corresponds to an example of a replenishment information acquisition process.

Subsequently, as in FIG. 8, at steps S15 and S25, the cartridge 410 is attached and the type of the cartridge 410 is detected (the process executed at step S25 corresponds to an example of a device-side detection process described in claims), and if F=0 is maintained and the determination of step S30 is negative (S30:NO), the procedure goes to step S35 as in FIG. 8.

At step S35, in this modification, on the basis of the replenishment request information acquired at step S10A, the CPU 444 determines whether the type of the cartridge 410 detected at step S15 is the type ordered to the management server 10 (corresponding to an example of a first type) or another type (corresponding to an example of a second type). In this modified example, the process executed at step S35 corresponds to an example of a first determination process described in claims and also corresponds to an example of a device-side determination process. In the case of the ordered type, the determination is affirmative (S35:YES), and the procedure goes to step S40 as in FIG. 8.

At step S40, as in FIG. 8, the CPU 444 switches the control mode from the normal mode to the medium-saving mode. The process executed at step S40 corresponds to an example of a device-side mode switching process described in claims. Subsequent steps S45 to S55 are the same as FIG. 8.

On the other hand, as in FIG. 8, after switching to the saving-medium mode at step S40 and setting F=1 at step S45, the determination is affirmative at step S30 (S30:YES), and the procedure goes to step S80 as in FIG. 8.

At step S80, the CPU 444 determines whether or not the cartridge type detected at step S25 is the type delivered after the order process executed at step S70. Therefore, in this determination, the CPU 444 receives the replenishment reception information (corresponding to an example of resolution information) from step S200 of FIG. 16 indicating that the ordered cartridges 410 have been safely delivered, and determines whether or not the detected cartridge type is the type considered as being delivered in the replenishment reception information. In the processes executed at step S80, the acquisition of the replenishment reception information transmitted at step S200 corresponds to an example of resolution information acquisition process described in claims in this modification example, and the process of determining whether the cartridge type detected at step S25 is the delivered type base on this information corresponds to an example of a second determination process described in claims in this modification example. If the type is not the delivered type, the determination is negative (S80:NO), and the procedure goes to step S47 to repeat the same procedure. If the type is the delivered type, the determination is affirmative (S80:YES), and the procedure goes through step S85 (corresponding to an example of the second mode switching process described in claims also in this modification example) and the step S90 as in FIG. 8 to the step S47 to repeat the same procedure.

Particularly in this modification example, the CPU 444 of the label printer 100 acquires the replenishment request information indicative of the type of the cartridge 410 ordered by the management terminal 200 (see step S10A of FIG. 17). It is then determined whether or not the cartridge 410 attached to the cartridge holder 427 is of the type corresponding to the acquired replenishment request information (i.e., the type in the ordering state) (see step S35 of FIG. 17) and, if the cartridge is of the type, the mode is switched to the medium-saving mode (see step S40 of FIG. 17).

(3) Other

Although a print is performed on the cover film 411 different from the base tape 416, and the base tape 101 and the cover film 103 are affixed together in the method described above; however, the present disclosure is not limited thereto, and the present disclosure may be applied to a method in which a print is performed on a print-receiving tape layer included in a base tape (a type without affixing). In this case, the base tape corresponds to an example of a print-receiving medium.

Furthermore, in the above description, the print-receiving tape roll formed by winding a print-receiving medium (the cover film 411 in the above example) and the base tape roll formed by winding the base tape 416 are arranged in the cartridge 410 and the print-receiving medium is fed out from the print-receiving tape roll; however, the present disclosure is not limited thereto. For example, it is conceivable that a cartridge having a different shape (corresponding to an example of a storage body in this case) including only the print-receiving tape roll is disposed or that a roll formed by winding the print-receiving medium is detachably attached directly to the label printer side (in this case, the roll corresponds to an example of the storage body).

It is noted that terms “vertical”, “parallel”, “plane”, etc. in the above description are not used in the exact meanings thereof. Specifically, these terms “vertical”, “parallel”, “plane”, etc. allow tolerances and errors in design and manufacturing and have meanings of “substantially vertical”, “substantially parallel”, and “substantially plane”, etc.

It is noted that terms “same”, “equal”, “different”, etc. in relation to a dimension and a size of the appearance in the above description are not used in the exact meaning thereof. Specifically, these terms “same”, “equal”, and “different” allow tolerances and errors in design and manufacturing and have meanings of “substantially the same”, “substantially equal”, and “substantially different”.

The arrows shown in the figures such as FIG. 5 indicate an example of a signal flow and are not intended to limit the signal flow directions.

The flowcharts shown in FIGS. 8, 16, 17, etc. are not intended to limit the present disclosure to the procedures shown in the flows, and the procedures may be added/deleted or may be executed in different order without departing from the spirit and the technical ideas of the disclosure.

The techniques of the embodiment and modification examples may appropriately be utilized in combination other than those described above.

Although not exemplarily illustrated one by one, the present disclosure is implemented with various modifications applied without departing from the spirit thereof.

What is claimed is:

1. A printer configured to perform printing, comprising:

an attaching part configured to attach a storage body storing a print-receiving medium in a suppliable manner;

a feeder configured to feed said print-receiving medium supplied from said storage body attached to said attaching part;

a printing head configured to form a printed matter by forming a desired print object onto said print-receiving medium fed by said feeder; and a CPU configured to control said feeder and said printing head in a predetermined control mode, said CPU executing:

a detection process for detecting a type of said storage body attached to said attaching part, a first determination process for determining on the basis of a detection result in the detection process whether the type of said storage body attached to said attaching part is a first type in an ordering state associated with insufficiency in quantity or a second type other than said first type, and a first mode switching process for, in the case that the type is determined as said first type in said first determination process, switching said control mode for controlling said feeder and said printing head from a normal mode prepared in advance correspondingly to said second type to a medium-saving mode prepared in advance correspondingly to said first type for reducing a consumption amount of said print-receiving medium than said normal mode.

2. The printer according to claim 1, wherein said CPU further executes:

a storage information acquisition process for acquiring storage information that indicates a quantity of storage bodies unused by said printer in a storage state for each type of said storage bodies;

a remaining amount information acquisition process for acquiring remaining amount information of said print-receiving medium in said storage body attached to said attaching part; and a replenishment request process for requesting replenishment of the type of said storage body attached to said attaching part on the basis of said remaining amount information acquired in said remaining amount information acquisition process and said storage information acquired in said storage information acquisition process, wherein in said first determination process, it is determined whether the type of said storage body attached to said attaching part is said first type in said ordering state with said request for replenishment made in said replenishment request process or said second type not in said ordering state without said request for replenishment.

3. The printer according to claim 2, wherein said CPU further executes a third determination process for determining whether or not a predetermined order timing has come, on the basis of said remaining amount information acquired in said remaining amount information acquisition process and said storage information acquired in said storage information acquisition process, and wherein in said replenishment request process, in the case that it is determined that said predetermined order timing has come in said third determination process, a request is made for the replenishment of the type of said storage body attached to said attaching part.

4. The printer according to claim 1, wherein said CPU further executes a replenishment information acquisition process for acquiring replenishment type information that indicates the type of said storage body for which a replenishment request has been made on the basis of the insufficiency in quantity, and wherein in said first determination process, it is determined whether the type of said storage body attached to said attaching part is said first type in said ordering state corresponding to said replenishment type information acquired in said replenishment information acquisition process or said second type not corresponding to said replenishment type information and not in said ordering state.

5. The printer according to claim 2, wherein said CPU further executes:

a second determination process for determining after entering a resolved state in which the insufficiency in quantity of said storage bodies of said first type is resolved whether the type of said storage body attached to said attaching part is said first type in said resolved state or said second type, on the basis of a detection result in said detection process; and a second mode switching process for returning said control mode for controlling said feeder and said printing head from said medium-saving mode to said normal mode in the case that it is determined that the type of said storage body is said first type in said second determination process.

6. The printer according to claim 4, wherein said CPU further executes:

a second determination process for determining after entering a resolved state in which the insufficiency in quantity of said storage bodies of said first type is resolved whether the type of said storage body attached to said attaching part is said first type in said resolved state or said second type, on the basis of a detection result in said detection process; and a second mode switching process for returning said control mode for controlling said feeder and said printing head from said medium-saving mode to said normal mode in the case that it is determined that the type of said storage body is said first type in said second determination process.

7. The printer according to claim 5, wherein said CPU further executes a resolution information acquisition process for acquiring resolution information indicating that the insufficiency in quantity of said first type is resolved, and wherein in said second determination process, it is determined whether the type of said storage body attached to said attaching part is said first type in said resolved state corresponding to said resolution information acquired in said resolution information acquisition process or said second type.

8. The printer according to claim 6, wherein said CPU further executes a resolution information acquisition process for acquiring resolution information indicating that the insufficiency in quantity of said first type is resolved, and wherein in said second determination process, it is determined whether the type of said storage body attached to said attaching part is said first type in said resolved state corresponding to said resolution information acquired in said resolution information acquisition process or said second type.

9. The printer according to claim 1, wherein said medium-saving mode is a mode for reducing a length in a transport direction of a first non-print portion that is a portion of said printed matter other than said print object, as compared to said normal mode.

10. The printer according to claim 1, wherein said medium-saving mode is a mode for reducing a length in a transport direction of a second non-print portion between adjacent characters in the case that said print object is composed of a character string, as compared to said normal mode.

11. The printer according to claim 1, wherein said medium-saving mode is a mode for reducing a length of a gap dimension between adjacent printed matters settable in advance in the case that a plurality of the printed matters is successively produced, as compared to said normal mode.

12. The printer according to claim 1, wherein said medium-saving mode is a mode for reducing a length in a transport direction required for a character by changing a font of said character in the case that said print object includes said character, as compared to said normal mode.

13. The printer according to claim 1, wherein said medium-saving mode is a mode for dividing a character string into a plurality of lines each extending in a transport direction to reduce a length in a transport direction required for said character string in the case that said print object is composed of said character string, as compared to said normal mode.

14. A non-transitory computer-readable medium storing a printing producing program for executing steps on an apparatus computer of a printer that includes an attaching part configured to attach a storage body storing a print-receiving medium in a suppliable manner, a feeder configured to feed said print-receiving medium supplied from said storage body attached to said attaching part, a printing head configured to perform a desired print onto said print-receiving medium fed by said feeder, and said apparatus computer configured to control said feeder and said printing head in a predetermined control mode, said steps comprising:

a detection step for detecting a type of said storage body attached to said attaching part;

a determination step for determining on the basis of a detection result in the detection step whether the type of said storage body attached to said attaching part is a first type in an ordering state associated with insufficiency in quantity or a second type other than said first type; and a mode switching step for, in the case that the type is determined as said first type at said determination step, switching said control mode for controlling said feeder and said printing head from a normal mode prepared in advance correspondingly to said second type to a medium-saving mode prepared in advance correspondingly to said first type for reducing a consumption amount of said print-receiving medium than said normal mode.

* * * * *

UNITED STATES PATENT AND TRADEMARK OFFICE

CERTIFICATE OF CORRECTION

PATENT NO. : 10,592,176 B2
APPLICATION NO. : 16/143882
DATED : March 17, 2020
INVENTOR(S) : Feng Zhu et al.

It is certified that error appears in the above-identified patent and that said Letters Patent is hereby corrected as shown below:

On the Title Page

Item (72), under Inventors:
Please delete “Inazzawa” and insert --Inazawa--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*